United States Patent
Herbert et al.

(10) Patent No.: US 9,151,029 B2
(45) Date of Patent: Oct. 6, 2015

(54) FLOW NOISE RESTRICTOR

(71) Applicants: Kay Herbert, Winthrop, MA (US); John R. Wilson, Naperville, IL (US)

(72) Inventors: Kay Herbert, Winthrop, MA (US); John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 270 days.

(21) Appl. No.: 13/627,620

(22) Filed: Sep. 26, 2012

(65) Prior Publication Data

US 2013/0082198 A1   Apr. 4, 2013

Related U.S. Application Data

(60) Provisional application No. 61/542,666, filed on Oct. 3, 2011.

(51) Int. Cl.
| | |
|---|---|
| *F16K 31/385* | (2006.01) |
| *E03D 3/06* | (2006.01) |
| *F16K 31/40* | (2006.01) |
| *F16K 47/04* | (2006.01) |
| *E03D 9/14* | (2006.01) |
| *E03D 3/04* | (2006.01) |

(52) U.S. Cl.
CPC .. *E03D 3/06* (2013.01); *E03D 3/04* (2013.01); *E03D 9/14* (2013.01); *F16K 31/3855* (2013.01); *F16K 31/402* (2013.01); *F16K 31/406* (2013.01); *F16K 47/04* (2013.01)

(58) Field of Classification Search
CPC ... F16K 31/85; F16K 31/385; F16K 31/3855; E03D 3/00; E03D 3/02; E03D 3/06; E03D 3/08; E03D 9/14; Y10T 137/86734; Y10T 137/86759; Y10T 137/86791; Y10T 137/86799
USPC ............... 137/625.3, 625.33, 625.37, 625.38; 251/38, 40, 120, 123
See application file for complete search history.

(56) References Cited

U.S. PATENT DOCUMENTS

| | | | | |
|---|---|---|---|---|
| 2,012,255 | A | * | 8/1935 | Binnall ............................ 251/37 |
| 3,990,475 | A | | 11/1976 | Myers |
| 4,024,891 | A | | 5/1977 | Engel et al. |
| 4,040,440 | A | | 8/1977 | Zaki |
| 4,248,270 | A | | 2/1981 | Ostrowski |
| 4,703,776 | A | * | 11/1987 | Rumney ..................... 137/625.3 |
| 4,793,589 | A | * | 12/1988 | Eldredge et al. ........... 251/30.03 |
| 5,150,877 | A | | 9/1992 | Whiteside et al. |
| 5,213,305 | A | | 5/1993 | Whiteside et al. |
| 5,244,179 | A | | 9/1993 | Wilson |
| 5,295,655 | A | * | 3/1994 | Wilson et al. .................... 251/40 |
| 5,332,192 | A | | 7/1994 | Whiteside |
| 5,335,694 | A | * | 8/1994 | Whiteside ................ 137/625.37 |
| 5,649,686 | A | * | 7/1997 | Wilson ............................ 251/40 |
| 5,865,420 | A | * | 2/1999 | Wilson ............................ 251/40 |

(Continued)

OTHER PUBLICATIONS

Zaman et al. "Evolution from 'Tabs' to 'Chevron Technology'—a Review," Proceedings of The 13th Asian Congress of Fluid Mechanics, Dec. 17-21, 2010, Dhaka, Bangladesh, 17 pgs.

(Continued)

*Primary Examiner* — Matthew W Jellett
(74) *Attorney, Agent, or Firm* — Foley & Lardner LLP

(57) ABSTRACT

A flow noise restrictor for use with a valve. The flow noise restrictor reduces the flow area as the valve closes and forms vortices to reduce the noise such as due to the Bernoulli effect.

13 Claims, 12 Drawing Sheets

(56) References Cited

U.S. PATENT DOCUMENTS

| | | |
|---|---|---|
| 5,881,993 A | 3/1999 | Wilson et al. |
| 5,887,848 A | 3/1999 | Wilson |
| 5,967,182 A | 10/1999 | Wilson |
| 6,182,689 B1 | 2/2001 | Lauer et al. |
| 6,260,576 B1 | 7/2001 | Allen |
| 6,616,119 B2 | 9/2003 | Wilson |
| 7,980,528 B2 | 7/2011 | Wilson |
| 2003/0042446 A1 | 3/2003 | Wilson |
| 2003/0116204 A1* | 6/2003 | Volovets et al. ........... 137/625.3 |
| 2007/0272887 A1 | 11/2007 | Carroll et al. |

OTHER PUBLICATIONS

Notification of the First Office Action dated Mar. 26, 2014, for Chinese Application No. 201210597614.3, 10 pages.

Office Action for Canadian App. No. 2,791,044 dated Dec. 3, 2013, 3 pages.

Notification of the Second Office Action for Chinese App. No. 201210597614.3 dated Oct. 21, 2014, 5 pages.

First Office Action for Mexican App. No. MX/a/2012/011364, dated Sep. 16, 2014, with English Translation, 5 pages.

* cited by examiner

FLOW NOISE RESTRICTOR

CROSS-REFERENCE TO RELATED APPLICATIONS

This application is related to and claims priority from U.S. Provisional Patent Application No. 61/542,666, filed Oct. 3, 2011 and is hereby incorporated by reference in its entirety.

FIELD OF THE INVENTION

The present invention generally relates to valves. More specifically, the present invention relates to flushometers or faucet valves having a flow noise restrictor.

BACKGROUND OF THE INVENTION

Numerous valves utilize a valve seat in their structure. Many of these structures have a valve structure that, typically, descends to seat upon the valve seat. Where there is a pressure differential between the area "upstream" of the valve seat and the area "downstream" of the valve seat, the energy of the system may be dissipated in undesirable ways. For example, cavitations and/or vibrations can occur, particularly at the moment the valve closes. These occurrences are often reflected in noise at the valve or its associated fixture or upstream/downstream due to vibrations traveling throughout the system. In liquid systems, the vibrations are sometimes caused by pressure waves traveling in the piping system that supplies the valve including what is commonly called water hammer. At other times the cause of the vibrations is more local due to gas trapped in the liquid providing an unstable dynamic system that tends to vibrate at certain flow conditions.

One particular type of valve that can exhibit "noise" problems is a flushometer, commonly used with water closets and urinals. Two particular types of flushometers are well known: diaphragm flushometers and piston flushometers. Diaphragm-type flushometers are exemplified by the flush valve shown in U.S. Pat. No. 6,616,119, which is hereby incorporated herein by reference. Piston-type flushometers are also known, as exemplified by the flush valve shown in U.S. Pat. No. 4,261,545, which is hereby incorporated herein by reference.

A flushometer or faucet valve includes a body 10 with an inlet 12 and outlet 14, a valve assembly 15 with a valve seat 26, a valve member 17 movable in the body 10 toward or away from the valve seat 26 to control flow from the inlet 12 to the outlet 14. The valve assembly 15 has a pressure chamber 50 acting on one side of the valve member 17 opposing the inlet pressure on the other side of the valve member 17. A bypass 40 connects the chamber 50 with the water inlet side. Pressure in the chamber 50 maintains the piston 80 or diaphragm 18 seated to the valve seat 26 and the valve assembly 15 in the closed position. There is a relief valve 30, which may be a mechanical relief valve stem 32 or a solenoid 99 (FIG. 3A) driven, that vents the chamber 50 to the outlet 14 side of the valve to permit the piston 80 or diaphragm 18 to move away from the valve seat 26 and open and control the water flow thru the valve. The piston 80 or diaphragm 18 may have a portion 89/48 to keep it concentric to the valve seat 26 and in axial alignment with the valve seat 26. The valve typically has a refill head 47 or similar flow control device on the outlet side of the diaphragm 18 or piston 80 to confine the path of flow. Valves of this kind are taught in prior art for example in U.S. Pat. Nos. 5,881,993; 5,887,848; 5,213,305; 5,244,179; 6,182,689; 6,260,576; 5,332,192 5,967,182.

It is well known, that in certain environmental and flow conditions, flushometers, such as those discussed above, can start to vibrate and cause noticeable and sometimes undesirable noise. Valve noise in the above described type of valves can be generated thru various mechanisms. If the pressure in some areas falls below vapor pressure due to the Bernoulli Effect, cavitation can occur, which can cause violent oscillations and forces on the valve. Air may become trapped or present in the air chamber, such as due to a high level of gas dissolved in the water from the inlet. Air entrapped in the pressure chamber 50 can introduce a different impedance, due to the variance in compression of the mixed air/water fluid compared to only water, of the piston/diaphragm and pressure chamber 50 and therefore make the flow unsteady. In addition, the piping upstream or downstream of the valve can cause undesirable oscillations in the valve.

This noise can also be described as flutter or water hammer. Numerous attempts have been made to address such noise. Some valves as described in U.S. Pat. No. 4,248,270 employ a resilient flow control device that deflects or deforms under the inlet pressure, and therefore dynamically controls the flow rate. U.S. Pat. No. 6,616,119 employs a diaphragm that has a molded rubber skirt on the inlet side of the flush valve which deforms with pressure and controls the flow. The skirt attempts to dampen vibration with "friction" tabs. The disadvantage of the resilient member often is that the modulus of elasticity of such members rapidly changes with temperature. It therefore makes it difficult to control the flow rates consistently over different operating temperatures due to the tabs' (of the '119 patent) friction against the outer diameter of the barrel.

Another means to control noise is to introduce friction between the moving diaphragm or piston and the valve housing. For example, U.S. Pat. No. 5,865,420 diaphragm teaches a refill head 47 on the outlet side of the valve which introduces friction between the housing and the moving refill head, therefore damping vibrations. The aforementioned refill head 47 on the inlet side also touches the housing barrel to introduce friction.

Some valves, e.g. U.S. Pat. No. 4,040,440 employ sound absorbing treatment on the outlet side, or generate turbulence as taught in U.S. Pat. No. 4,967,998. Some flushometer designs have grooves in the outlet skirt as well (made of plastic or metal) to control the flow as well. Other cage type valves employ perforated and grooved members, plugs and skirts as a means to make the flow turbulent to reduce noise throughout the flush cycle as shown in U.S. Pat. No. 4,024,891 or 3,990,475. However, the limited stroke of the chamber controlled valves does not allow for elaborate absorption treatment or perforation of members. In addition, the difficulty of those perforated and grooved members shown in prior art, is that even though they suppress noise thru the introduction of turbulence, they severely restrict flow thru the valve when the valve is in an open position or opening/closing stroke. In other configurations, the geometry adds friction or flow resistance to the opening or closing stroke. This cannot be adopted in valves that have a smaller stroke and larger flow rate requirements.

Further complicating matters, some of the portion of the noise/hammer occurs at the moment before the closing of the valve is completed. The Bernoulli effect is especially strong at that moment, as the inlet pressure builds up to static pressure of a typical residential or commercial water supply line, while at the same time the pressure on the outlet dramatically reduces (typical to atmospheric pressure). Present mechanisms at the outlet side of the valve seat have only little effect at that moment.

SUMMARY OF THE INVENTION

One embodiment of the invention relates to a flow noise restrictor having features for generating vortices.

One embodiment of the invention relates to a flush valve having a valve body having an inlet and an outlet. A valve assembly is included comprising a valve member and a valve seat. The valve member is seatable upon the valve seat to seal the inlet from the outlet. The valve assembly has a flow noise restrictor adjacent to the valve seat and partially defining a fluid flow path. The flow noise restrictor has a sidewall and a fluid flow edge defining a plurality of features.

One embodiment of the invention relates to a valve assembly comprising a valve member and a valve seat. The valve member is seatable upon the valve seat to seal the inlet from the outlet. The valve assembly has a flow noise restrictor adjacent to the valve seat and partially defining a fluid flow path. The flow noise restrictor has a sidewall and a fluid flow surface defining a plurality of features.

One embodiment of the invention relates to a flow noise restrictor for use with a valve assembly. The flow noise restrictor comprises a circular sidewall. The circular sidewall has an upper edge and a lower edge nonparallel with each other. One of the upper edge and lower edge configured to engage a portion of a flush valve. The other of the upper edge and lower edge define a plurality of features.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4A illustrates a flow noise restrictor having triangular features; FIG. 4B illustrates a flow noise restrictor having sinusoidal features; FIG. 4C illustrates a flow noise restrictor having irregular, sharp features; FIG. 4D illustrates a flow noise restrictor irregular, sharp features and large window openings.

FIG. 6A illustrates a flow noise restrictor having piston features; FIG. 6B illustrates a flow noise restrictor having sinusoidal features; FIG. 6C illustrates a flow noise restrictor having irregular, sharp features; FIG. 6D illustrates a flow noise restrictor irregular, sharp features and large window openings.

DETAILED DESCRIPTION OF THE PREFERRED EMBODIMENTS

Figure 1:
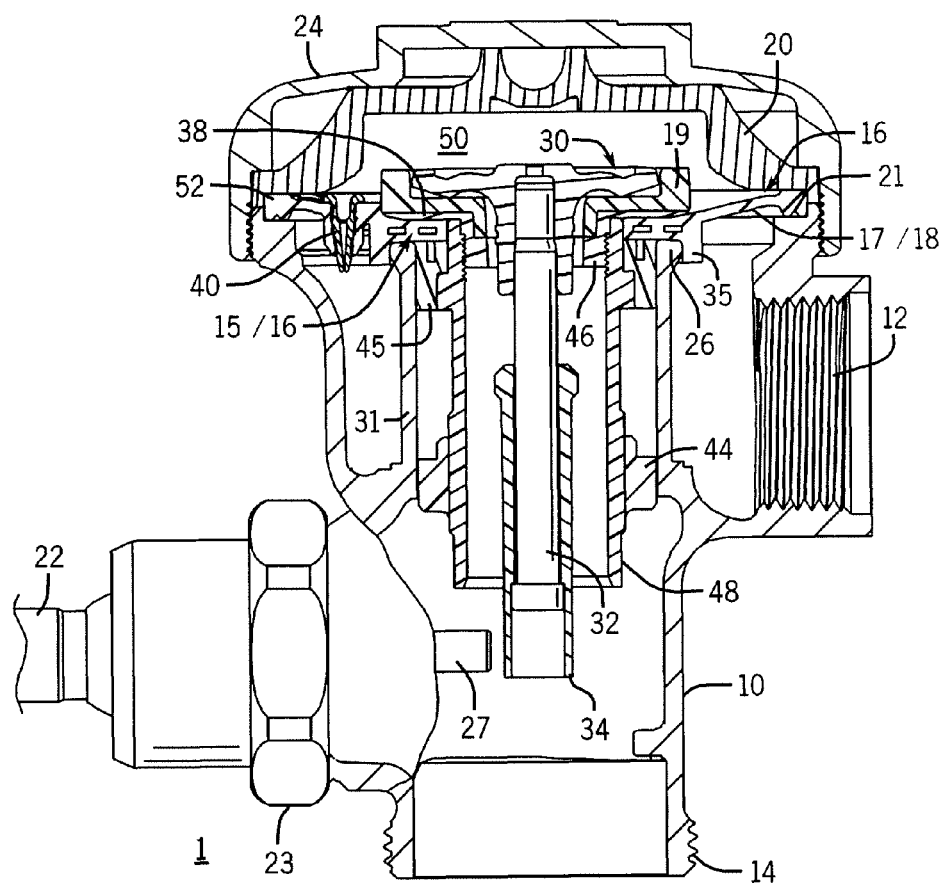
FIG. 1 is a side, partial sectional, view of a diaphragm flushometer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In some embodiments, the present invention relates to a flow noise restrictor 100 associated with a valve assembly 15 in a flushometer valve 1. The flow noise restrictor 100 may have features 110 (such as regular triangular features 111, sinusoidal features 113, and irregular triangular features 113), which create vortices between the valve member 17 and the valve seat 26 as the valve member 17 is being seated. The flow noise restrictor 100 narrows the inflow area as the valve assembly 15 closes. It should be appreciated that the water may flow through an area defined by the valve seat 26 and the flow noise restrictor 100, with the features 110 of the flow noise restrictor 100 contributing to that area. As the distance between the flow noise restrictor 100 and valve seat 26 decreases during the valve assembly 15 closure, the percentage of the flow area contributed by the features 110 of the flow noise restrictor 100 increases. The features 110 of the flow noise restrictor 100 introduce larger scaled vortices that provide mixing of the fluid without significantly changing flow resistance in the open position or adding friction to the opening and closing stroke.

Figure 2:
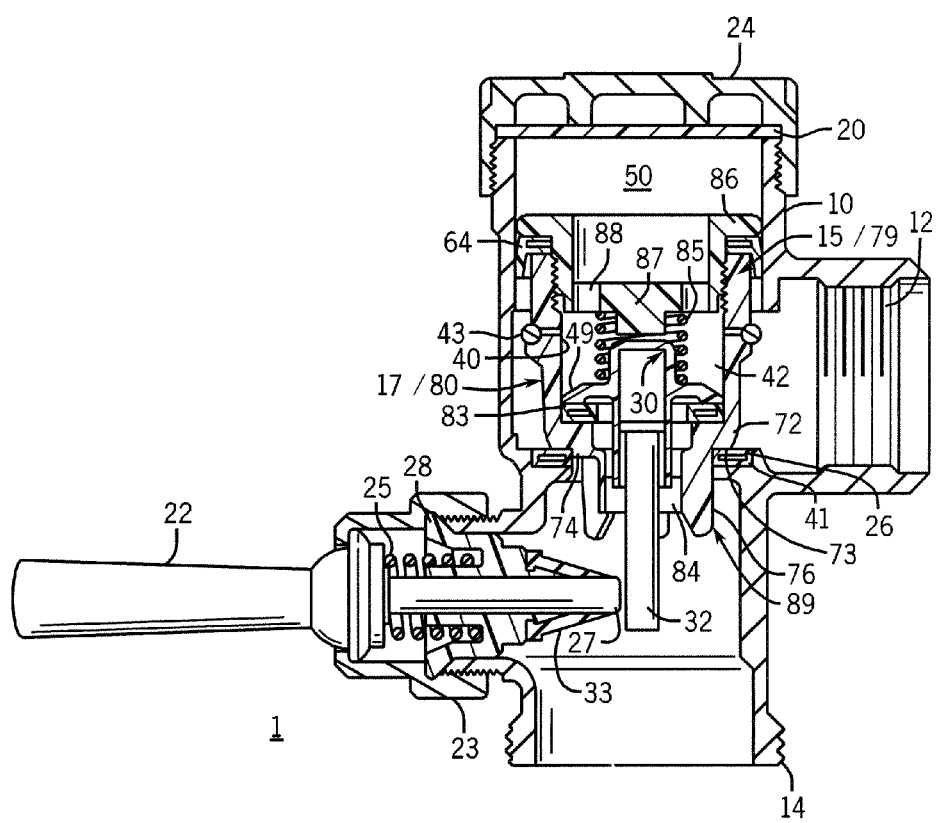
FIG. 2 is a side, partial sectional, view of a piston flushometer.
Figure 3A:
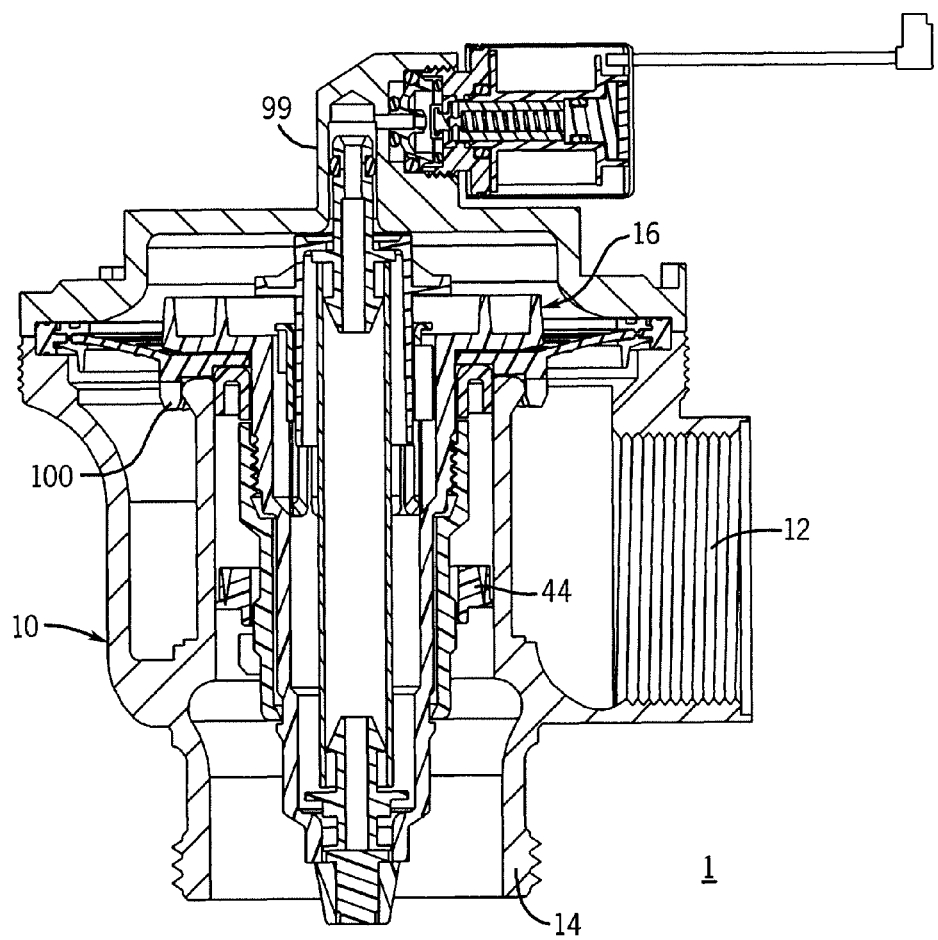
FIG. 3A is a side, cross-sectional view of a diaphragm valve of one embodiment of the invention.
Figure 3B:
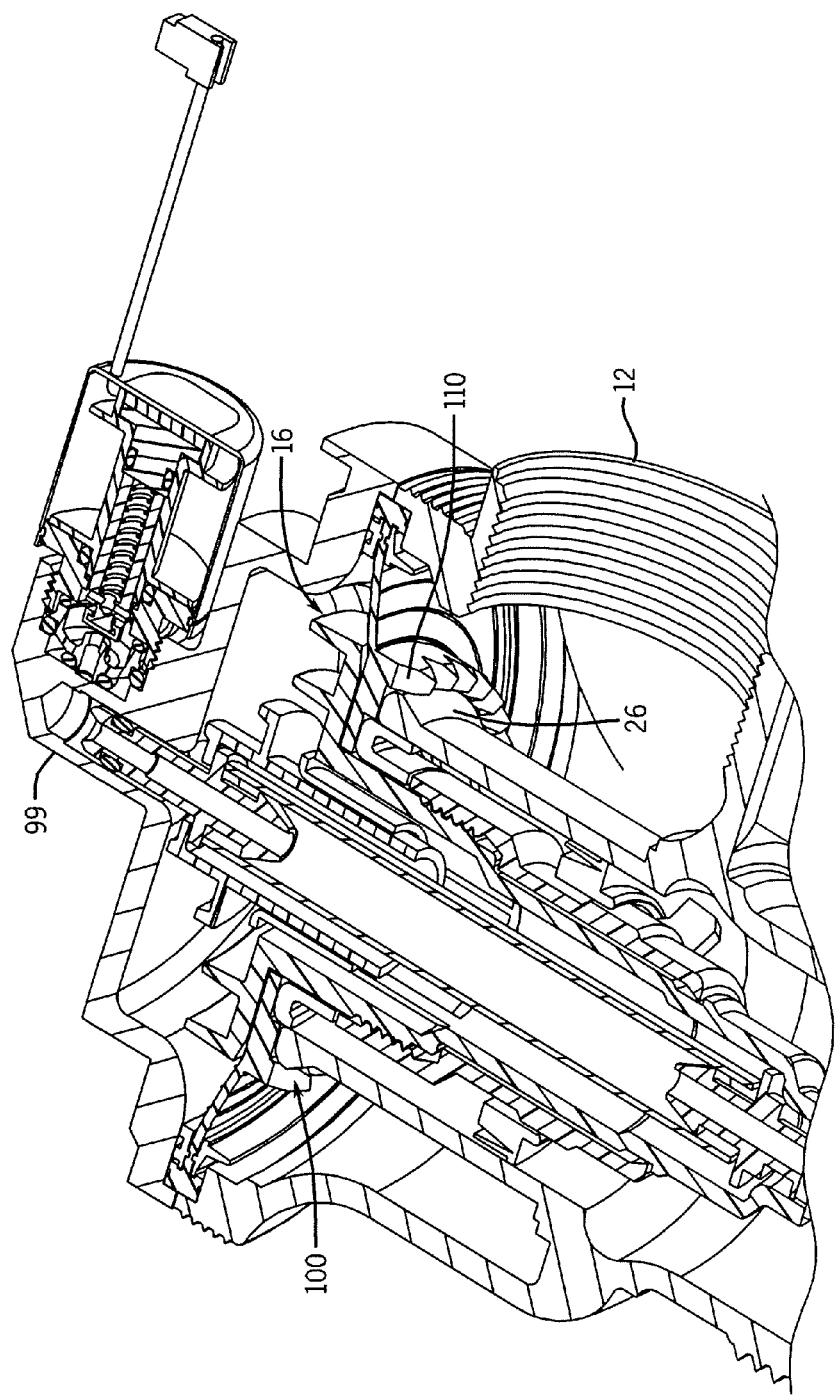
FIG. 3B is a perspective, cross-sectional view of the diaphragm valve of FIG. 3A.

FIG. 1 illustrates a typical prior art diaphragm flushometer valve and FIG. 2 illustrates a typical prior art piston flushometer valve. The flush valve 1 includes a body 10 having an inlet 12 and an outlet 14 and a main valve seat 26 for sealing by a valve assembly 15. A pressure chamber 50, or electronic control mechanism (for example, as shown in FIG. 3A), is typically provided above the valve assembly 15. This pressure chamber 50 may be pressurized by the line pressure of the inlet through bypasses 40 which place the pressure chamber 50 in fluid communication with the inlet 12. The pressure chamber 50 is sealed from the outlet 14 by a relief valve 30 of the valve assembly 15. The relief valve 30 includes a relief valve stem 32 extending downward through a relief valve seat 38 within the valve assembly 15 such that unseating of the relief valve 30, such as by tilting the valve stem 32, allows venting of the pressure chamber 50 to the outlet 14. This reduces the pressure in the pressure chamber 50, allowing the valve assembly 15 to be forced off of the main valve seat 26 by the pressure of the inlet 12. The water from the inlet 12 may then pass through the main valve seat 26 to the outlet 14. The valve assembly 15 reseats as the pressure chamber 50 reaches equilibrium pressure with the inlet forces acting on the valve assembly 15.

With reference to FIG. 1 (diaphragm flushometer) and FIG. 2 (piston flushometer), the valve assembly 15 is actuated by an operating handle 22 which is fastened to the valve body 10 by means of a coupling nut 23. The handle 22 is connected to a plunger 27 which extends to the interior portion of the valve body 10 below the main valve seat 26. As best shown in FIG. 2, the plunger 27 is guided and supported by a bushing 28 and is restored by a spring 25. A seal packing 33 may be snapped on the end of bushing 28 and prevents leakage outwardly from the handle opening. The valve 1 as shown in FIGS. 1 and 2 has a manual handle 22 for operation. The valve 1 is equally adaptable to automatic operation, for example by a solenoid 99 as set forth in U.S. Pat. No. 3,778,023, either by mechanized action on the handle 22 or an automatic actuation device directly interacting with the plunger 27 or relief valve stem 32.

With respect to FIG. 1, the valve assembly 15 of a diaphragm flushometer valve is a diaphragm assembly 16 that includes a diaphragm 18. In one embodiment, the diaphragm 18 is peripherally held to the body 10 by an inner cover 20. The diaphragm 18 is seated upon a shoulder 21 at the upper end of body 10 and is clamped in this position by the inner cover 20. An outer cover 24 is screw threaded onto the body 10 to hold the inner cover 20 in position.

The diaphragm assembly 16, as shown in the embodiment of FIG. 1, is closed upon a valve seat 26 formed at the upper end of a barrel 31. The barrel 31 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 27 when operated by a handle 22 as its is conventional in the operation of flush valves 1 of the type described.

In one embodiment, the diaphragm assembly 16, in addition to diaphragm 18 and the relief valve 30, includes a retaining disk 19, a refill ring 45 and a flow control ring 44. It should be appreciated that the diaphragm 18 may be a unitary component, such as described in U.S. Pat. No. 7,980,528, incorporated by reference herein. The underside of the retaining disk 19 is threadedly attached to a collar 46, which in turn is threadedly attached at its exterior to a sleeve 48 which carries the refill ring 45. The above described assembly of elements firmly holds the diaphragm 18 between the upper face of the refill ring 45 and a lower facing surface of the collar 46.

Above the diaphragm assembly 16 is the pressure chamber 50, which maintains the diaphragm assembly 16 in a closed position when the flush valve 1 is not in use. The pressure chamber 50 is fillable via the bypasses 40 and vents through the relief valve 30 into the barrel 31 and ultimately the outlet 14 of the flush valve 1.

As is known in the art, such as FIG. 1, when the handle 22 is operated, the plunger 27 will contact sleeve 34, lifting the relief valve 30 off its seat on the retaining disk 19. This will permit the 50 discharge of water within the pressure chamber 50 down through the sleeve 84. Inlet pressure will then cause the diaphragm 18 to move upwardly off its seat 26, permitting direct communication between the inlet 12 and the outlet 14 through the space between the bottom of the diaphragm assembly 16 and the seat 26. As soon as this operation has taken place, the pressure chamber 50 will begin to build through the bypass orifice 40 in the diaphragm assembly 16. As flow continues into the pressure chamber 50, the diaphragm assembly 16 will move toward its valve seat 26 and stop when it has reached that position, the flush valve 1 will be closed.

The diaphragm 18 of FIG. 1 has a peripheral edge 52 which will be held between the shoulder 21 of the body 10 and the inner cover 20. Spaced from the edge 52 is a downwardly extending rim 35, shown particularly in the section of FIG. 1. When in the closed position, the rim 35 will extend about the upper end of the barrel 31. In one embodiment, the features 110 are sized on a order of magnitude relative to the distance of the stroke of the valve assembly 15.

Generally speaking, for a manual valve, the valve 1 is opened when an relief valve stem 32 is moved and opens a passage to the pressure chamber 50 above the diaphragm 18 or piston 80, and vents at least a portion the liquid to the outlet 14 side of the valve 2, therefore lowering the pressure above the diaphragm 18 or piston 80 and allowing the pressure below the diaphragm 18 or piston 80 to move the respective diaphragm 18 or piston 80, thus opening the valve. For embodiments using an automatic actuation mechanism that triggers the plunger 27, a similar process occurs. For embodiments utilizing a separate actuation mechanism from the traditional handle 22, such as utilizing a solenoid, the pressure chamber 50 above the diaphragm 18/piston 80 is opened by electronic means such as a latching solenoid valve 99, draining said cavity to the outlet side of the valve 1, allowing the piston 80/diaphragm 18 to move to the open position. Various automatic or manual actuation systems are known in the art and may be used without departing from embodiments of the present invention.

In one embodiment, the flow noise restrictor 100 may be used with a piston flushometer having piston assembly 79. A piston assembly 79 indicated generally at 34 is adapted to reciprocate within the body 10. Although one embodiment of a piston assembly 79 is described below, it should be appreciated that the various types of piston assemblies may be used without departing from the present invention. The piston assembly 79 includes a hollow, generally cylindrical piston 80. The piston 80 has a lower cylindrical portion 89 which is directly adjacent a piston seat area 73, with the seat area 73 being normally seated upon a seal 83 to close the main valve seat 26 and to thereby control the flow of water through the flushometer valve 1.

The piston 80 of FIG. 2 has a pair of bypass orifices 40, which are illustrated with an optional filter ring 43, which ring 43 functions according to known principles for providing additional anti-clogging properties. The interior chamber 42 of the piston 80 has an relief valve seat 38, which may include a seal 83. The seat 38 and seal 83 are at the top of a central passage which connects chamber 42 with the outlet 14 side of the flushometer valve 1.

The piston assembly 79 also includes a relief valve 30 which normally closes the piston 80. The relief valve 30 has a shoulder 49 which engages the seal 83. An operating stem 32 is slidable in the interior chamber 42 of the relief valve 30 and extends to a point adjacent plunger 27. A spring 85 assists in holding the relief valve 30 in its position to close and seal chamber 42.

The piston assembly 79 further includes a cap 86 threadedly engaging the upper wall of piston 80. The cap 86 has a central stop 87 against which the spring 85 abuts. The stop has holes 88 which provide fluid communication between the piston interior chamber 42 and an upper pressure chamber 50. A packing member or seal member 64 held between the cap 86 and piston 80 provides a slidable seal separating the pressure chamber 50 from the inlet's 12 water pressure except through the bypass 43.

The piston 80 has a cylindrical wall 70 which is preferably smooth and unobstructed. Directly adjacent the cylindrical wall 70 is a tapered piston area 72 which may have a taper of on the order of about ten degrees, which taper is effective to provide a clear flow path about the piston when it is in the raised position away from the valve seat 26. Directly adjacent the tapered area 72 is the piston seat area 73 which will close upon the seat 26 when the valve is in the closed position. Directly downstream of the piston seat area 73 is a ring 74 which has an outer diameter slightly less than the diameter of the valve outlet adjacent the seat 26 so that ring area 74 will be inside of the valve seat 26 when the piston 80 is closed. The ring 74 functions as a throttling means in that it substantially reduces flow through the valve outlet just prior to complete valve closure.

Directly adjacent the throttling ring 74 is cylindrical portion 89 which has a plurality of radially and axially extending ribs 76. The outer diameter of the ribs 76 is less than wall 70 and just slightly less than the passage through seat 26. The ribs 76 are thus inside of the major portion of the piston 80 so as not to restrict flow. In a preferred embodiment five ribs 76 are provided for maximizing stability and guidance for the piston 80, without detrimentally obstructing water flow past the piston 80 when the piston 80 is in the valve open position. At the lower end of each of the axially extending ribs there is a chamfered area 78 which assists in assembling the piston 80 within the flushometer valve 1.

The area between each of the circumferentially, generally uniformly spaced ribs 76 is closed by a skirt 90. As shown, the skirt 90 has a radius slightly less than the exterior surface of the ribs 76. The function of the skirt 90 is to close the area between ribs to provide control of water flow past the piston 80, which in turn will provide a more consistent operation of the flushometer. The skirt 90 improves the flow path by maintaining it in an axial direction generally circumferentially about the cylindrical piston portion 89. By preventing water flow into the sleeve 48, the skirt 90 also helps prevent any back pressure which might retard closure of the relief valve 30.

Typically, during the flush cycle, the water below the valve assembly 15 and passing over the main valve seat 26 exhibits generally laminar flow. The present invention relates to the suppression of noise in valve assemblies. In one embodiment, the present invention suppresses noise at the closing of the valve by causing a maximized pressure drop right before valve closure and also introducing vortices (whirling flow+ turbulent flow) into the flow to stabilize the flow across the valve seat 26. Whirling flow suppresses noise while at the same time not restricting the flow.

In one embodiment, the invention may be in a form of a flow noise restrictor 100 at the inlet side of the valve. The flow noise restrictor 100 may be a portion of the rim 35, with a series of regular or irregular features 100. In some embodiments, the flow noise restrictor 100 is near to the valve seat 26, such as adjacent the valve seat 26. FIGS. 3A-4D illustrate a diaphragm assembly 16 flushometer valve 1 having a flow noise restrictor 100 of the present invention. FIGS. 5A to 6D illustrate a solenoid controlled piston assembly 78 flushometer valve 1 having a flow noise restrictor 100 of the present invention.

In some embodiments the flow noise restrictor 100 includes a sidewall 101, a valve assembly surface 102 adjacent a portion of the valve assembly, for example abutting against the diaphragm 18, and a flow surface 103, which may be an edge or face of the sidewall 101. In one embodiment, the flow noise restrictor 100 has a ring-like shape. The flow surface 103 is defined by a plurality of features in the sidewall 101. In one embodiment, the flow surface 103 is non-parallel with the valve assembly surface 102 and/or the valve member 17.

It is not necessary, in one embodiment, for the flow noise restrictor 100 to be in direct contact with the valve seat 26 or the valve body 10. The flow noise restrictor 100 controls the flow through the valve 1 by restricting the area through which the flow may pass. In one embodiment, more as the piston 80 or diaphragm 18 reaches the valve seat 26 and less as the valve fully opens. In certain embodiments, the flow noise restrictor 100 has proportions relative to the other components of the flushometer valve 1 and particularly relative to the area through which the water flows during a flush cycle that allow for the impact of the induced vortices to become meaningful just prior to the valve 1 closing. It should be appreciated that such allows for unhindered flow when the valve 1 fully opens, but creates an increasing pressure drop before flow reaches the valve seat 26 while closing. This is achieved by giving the flow noise restrictor 100 a variable circumferential cross section, where the cross sectional area (allowing for water flow, such as the area of windows 58) increases in the direction of the opposing portion of the valve assembly 15.

In one embodiment, the flow noise restrictor 100 comprises a series of features 110, which may have one or more associated shape (such as triangular 111, sinusoidal 112, or irregular triangular 113). For embodiments as discussed where the cross sectional area increases, these features 110 have, on average, a decreasing width from a portion of the feature closest the valve assembly surface 102 of the flow noise restrictor 100. It should be appreciated that individual features 110 may have an inverted shape where the width decreases but the overall total width of all features 110 increases. The features 110 may be such that the flow surface 103 defines a side of the sidewall 101.

In one embodiment, at least a portion of the features 110 are holes in the flow noise restrictor 100. For embodiments where the cross sectional area increases, the area of the holes and/or the number of holes may increase towards the flow surface 103 of the flow noise restrictor 100. For each particular annular cross-sectional slice or plane, the features define a width. The width of the features may vary in each cross-sectional slice. For example, the width may increase as one proceeds from the valve assembly surface 102 to the flow surface 103.

In one embodiment, the flow noise restrictor 100 includes a sidewall 101 that is either curved, curvilinear, or a series of linear edges. The height of the sidewall 101, i.e. the distance between the flow surface 103 and the valve assembly 15 may vary. In one embodiment, the features 110 are symmetrical. In another embodiment, the features 110 are nonsymmetrical, i.e. irregular.

Figure 4A:
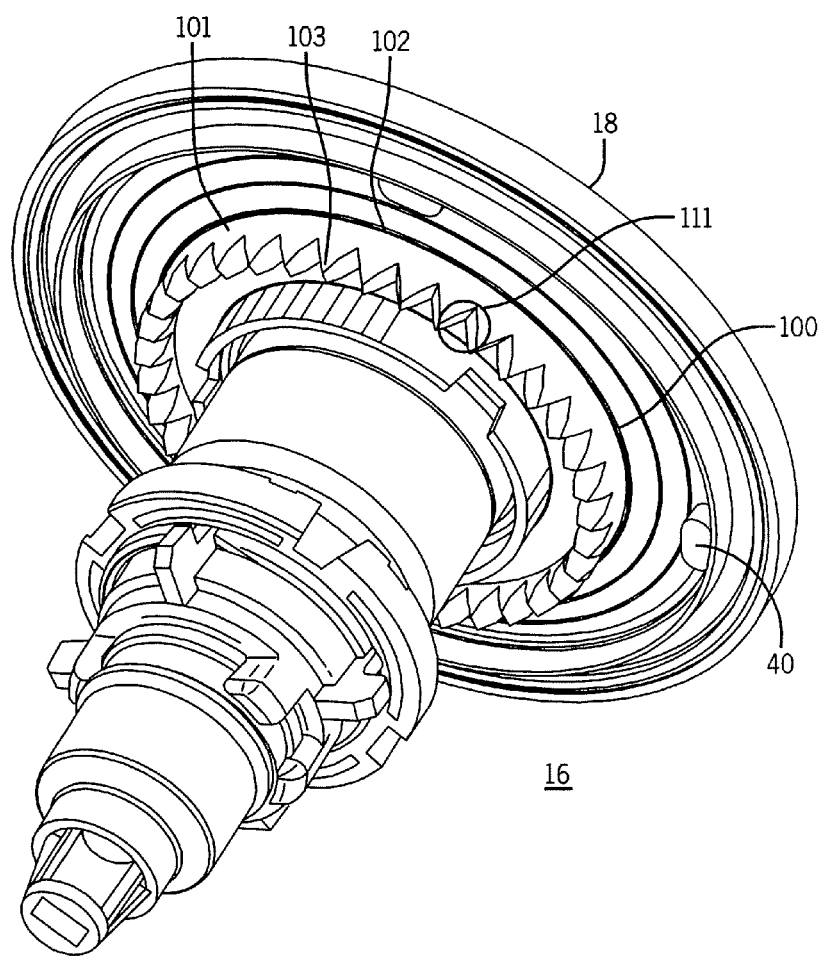
FIGS. 4A-4D illustrate diaphragm valve assemblies of various embodiments.
Figure 4B:
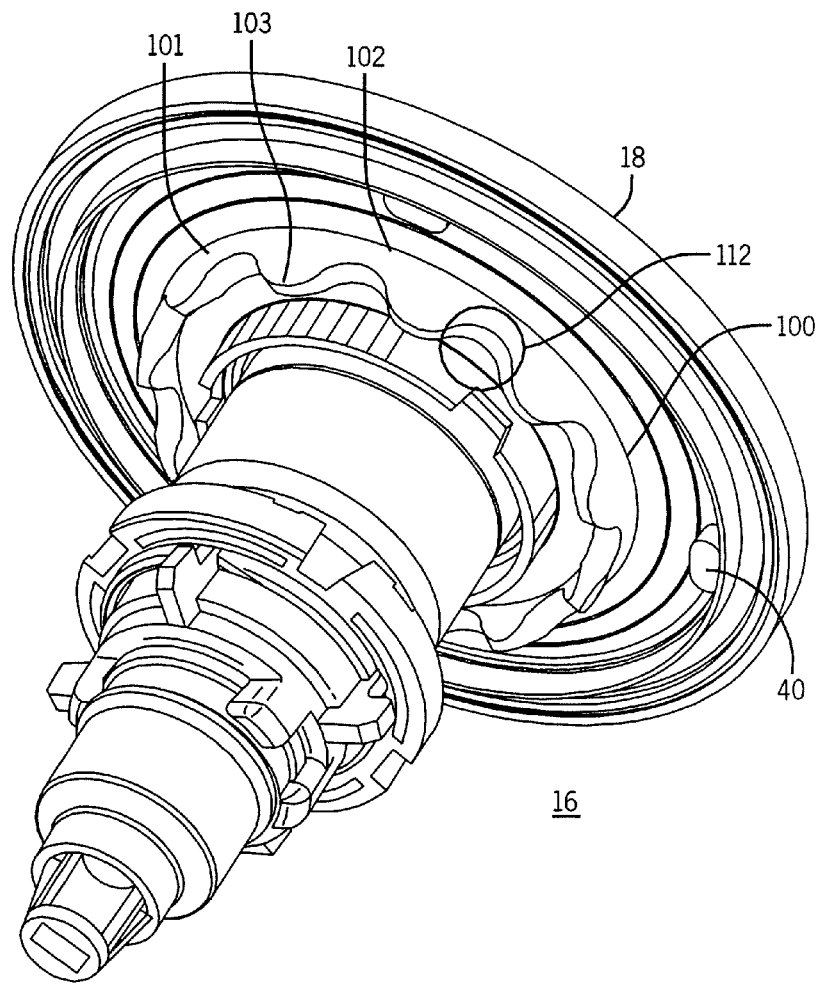
Figure 4C:
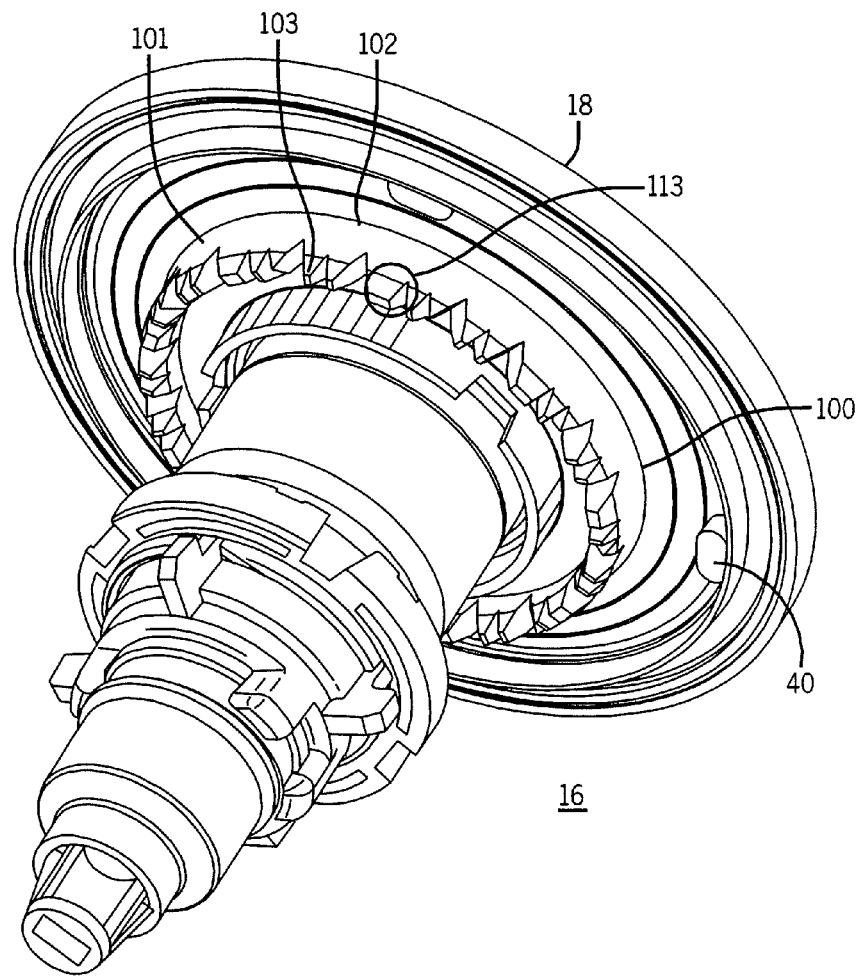
Figure 6A:
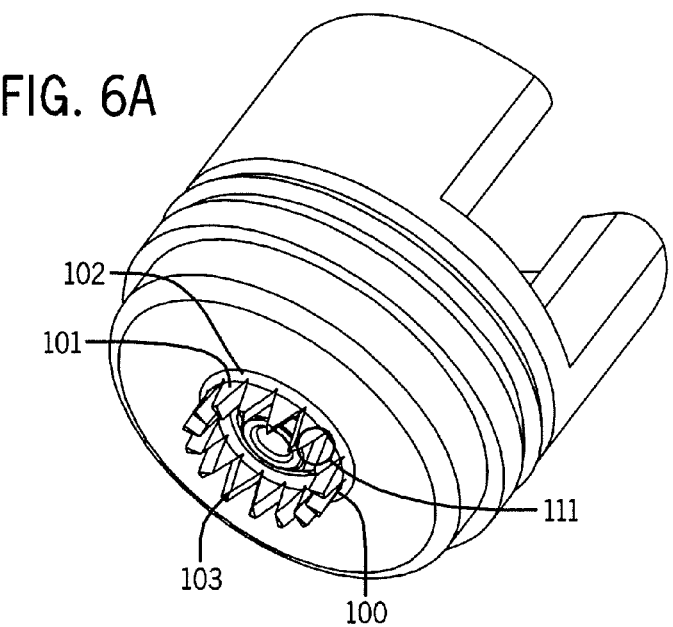
FIGS. 6A-6D illustrate piston valve assemblies of various embodiments.
Figure 6B:
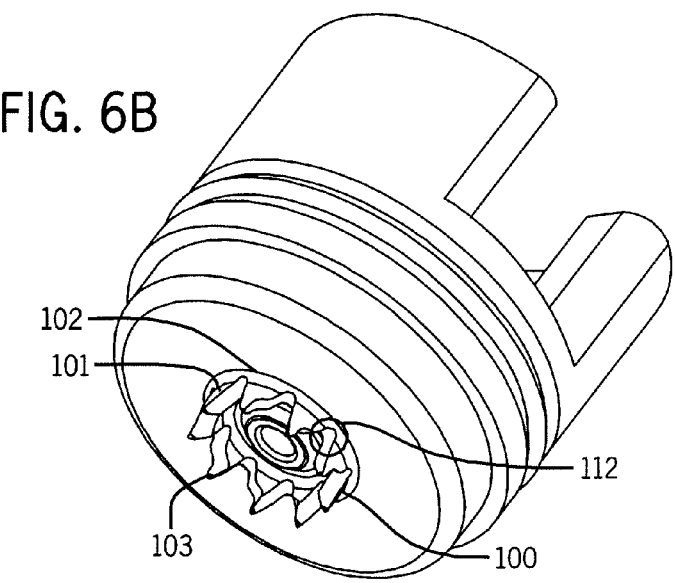
Figure 6C:
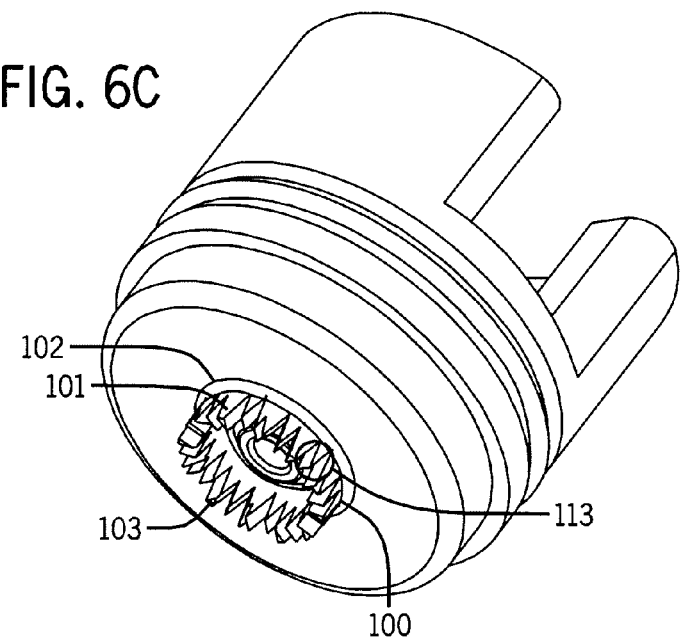

In one embodiment illustrated in FIG. 4A (diaphragm) and FIG. 6A (piston flushometer), this is achieved with triangular shaped features 111 in the sidewall 101 of the flow noise restrictor 100, which is spaced about the circumference of the valve seat 26. The triangular pattern around the circumference could be replaced with other geometries such as semi circular or sinusoidal 112 (FIG. 4B (diaphragm) and FIG. 6B (piston flushometer)), as long as it has a large base area that gets gradually smaller away from flow surface 103. In addition, the features 110 may be irregular such as FIG. 4C (diaphragm) and FIG. 6C (piston flushometer), In one embodiment, there are at least three features 110 along the circumference of the valve seat. In one embodiment, as many features 110 as feasible are provided to introduce multiple three-dimensional vortical flow structures into the inlet flow to the valve seat 26, with the hi and low differential in the geometry of the flow noise restrictor 100. However, the circumferential structures/features need to stay large enough to influence the flow gradually over a larger part of the closing stroke of the diaphragm 18/piston 80. In addition, in one embodiment, the features 110 of the flow noise restrictor 100 may be sharp features to add small scale turbulent structures to the inflow of the valve seat 26 geometry. In one embodiment, the features 110 are substantially evenly spaced annularly about the flow noise restrictor 100.

In the preferred embodiment the flow noise restrictor 100 on the inlet side of the valve seat 26 is combined with an existing noise reduction design such as methods of friction and flow restriction. This allows for two steps of pressure reduction between the inlet 12 and outlet 14 of the closing valve 1 and therefore minimizes the possibility of cavitation noise. First, the flow noise restrictor 100 provides for a pressure reduction. Second, the refill ring 45 (e.g., for a diaphragm flushometer) provides a reduction in pressure on the outlet 14 side. The use of the flow noise restrictor 100 allows for the suppression of noise (vibration) purely by manipulating the flow.

In one embodiment, the flow noise restrictor 100 is positioned adjacent either the valve seat 26 or the piston 80/diaphragm 18. In an embodiment, the flow noise restrictor 100 is mounted on a moving member of the valve 1, such as the diaphragm 18 or piston 78, but an alternate method can be envisioned where the flow noise restrictor 100 can be part of the valve housing or made of two parts, one part being attached to the housing or valve seat and one attached to the diaphragm 18/piston 80. In one embodiment, a piston flushometer includes the flow noise restrictor positioned about the periphery of the piston 80. In one embodiment, at the tapered area 72. In a further embodiment, the flow noise restrictor 100 includes a portion about the periphery of the piston 80 and a corresponding portion engagable therewith on the valve seat 26.

In one embodiment, the downwardly extending rim 35 comprises the flow noise restrictor 100, with the features 110 being defined by portions of the rim 35 that are removed.

Figure 4D:
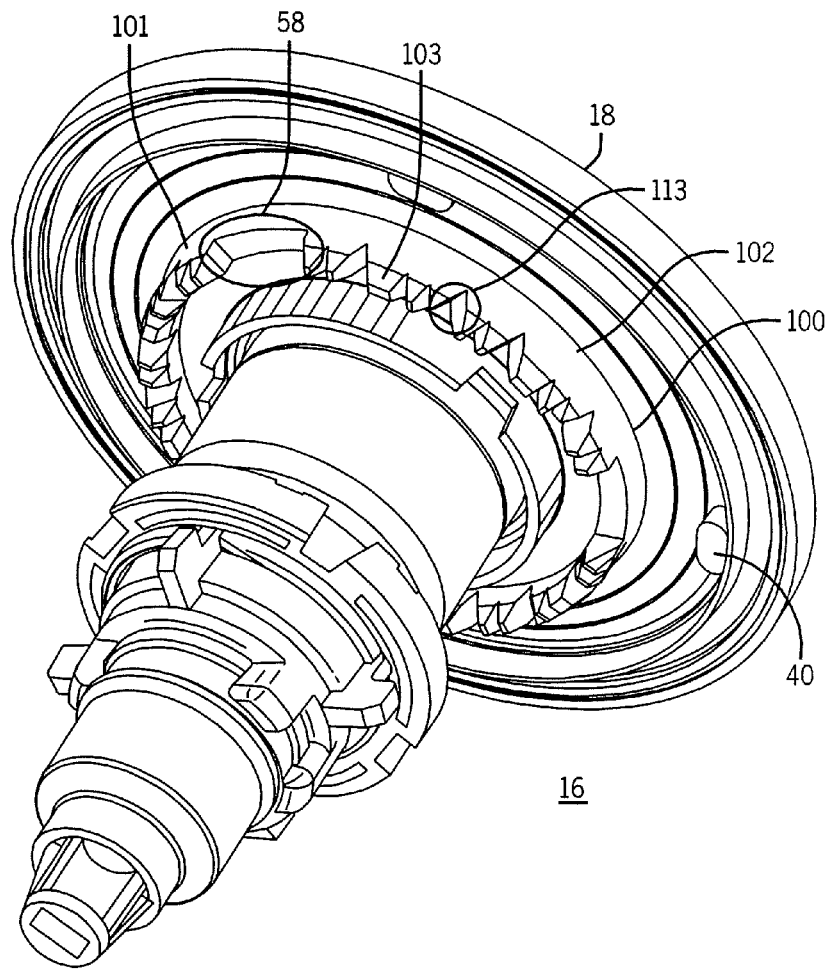
Figure 5A:
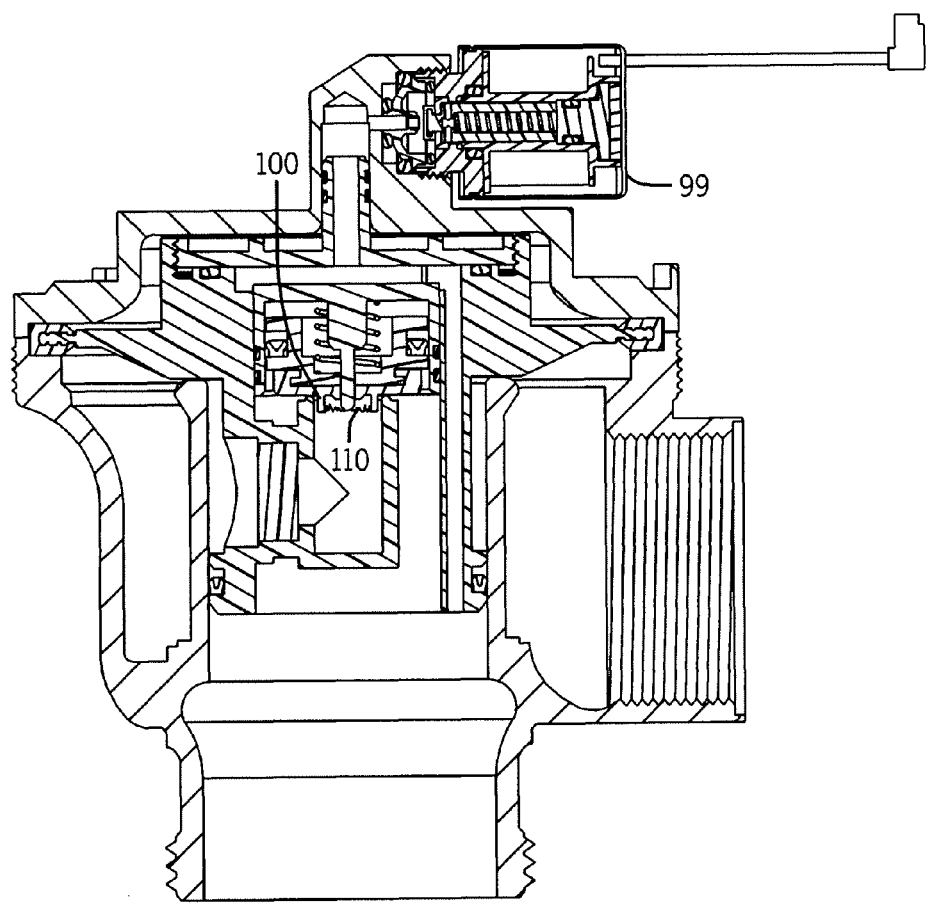
FIG. 5A is a side, cross-sectional view of a piston valve of one embodiment of the invention.
Figure 5B:
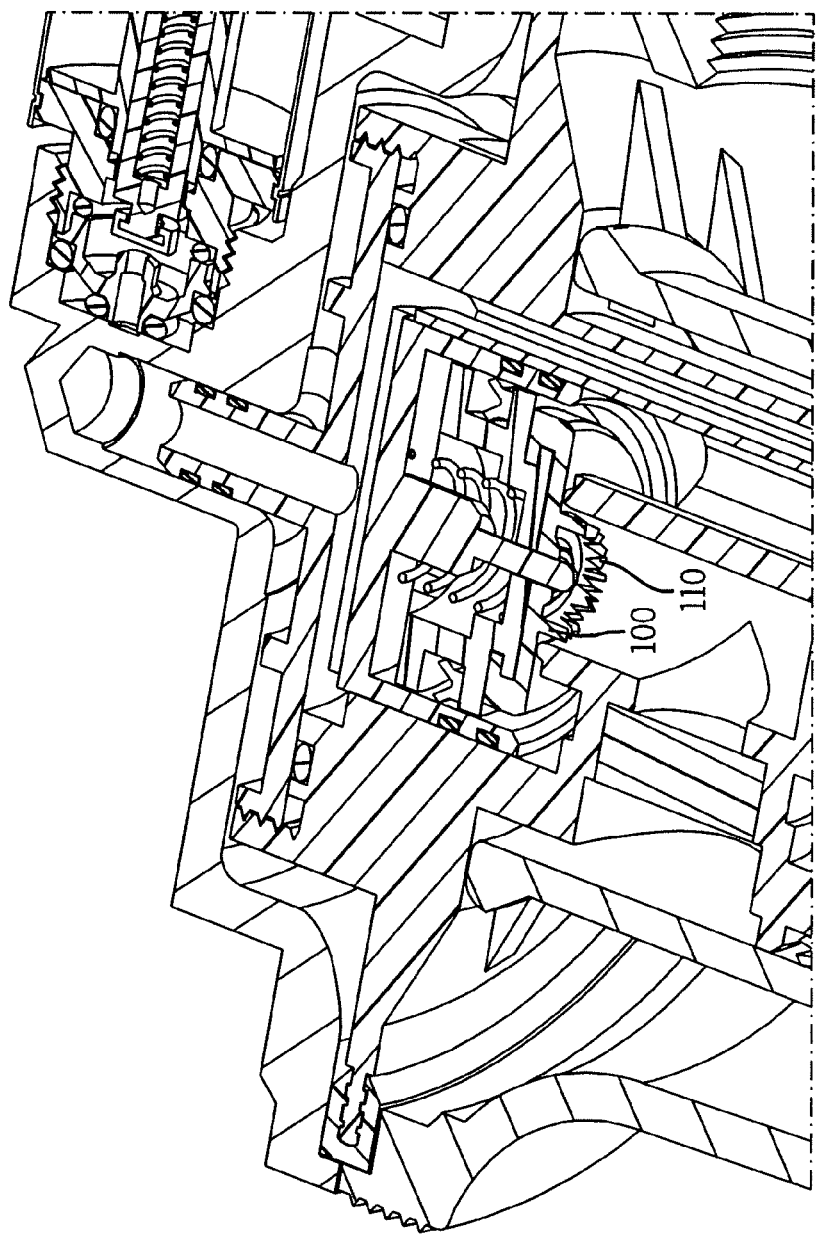
FIG. 5B is a perspective, cross-sectional view of the piston valve of FIG. 3A.
Figure 6D:
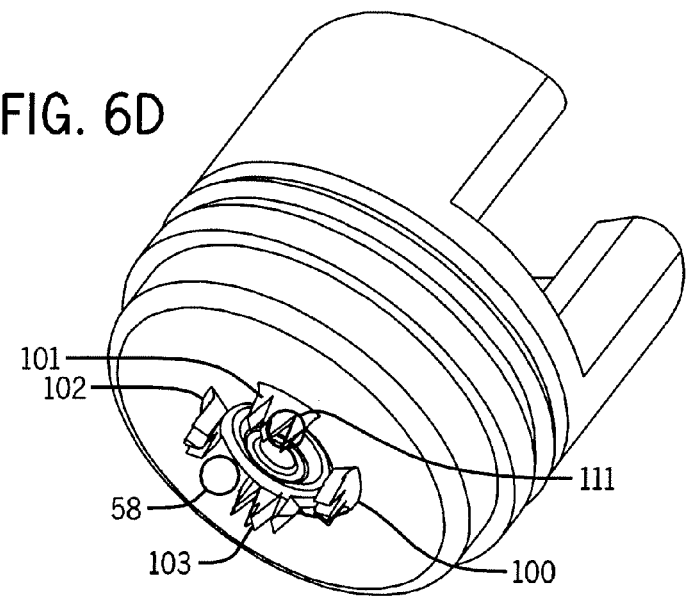

In one embodiment, the features may include one or more windows 58. As shown in FIGS. 4D and 6D, wherein the flow noise restrictor 100 includes a plurality of windows 58 which will modulate the flow of water as the diaphragm 18 (or piston 80) closes upon the valve seat 26 at the upper end of the barrel 31. The windows 58 provide a uniform shape that does not alter the flow area as the valve closes, i.e. the cross-sectional area remains the same during closing. The windows 58 are significant openings in the flow noise restrictor 100 sidewall 101 when compared to the size of the individual features 110. The window's 58 geometry size and shape is not small enough to add sufficient vorticity to suppress noise.

In one embodiment, the features 110 are molded into the flow noise restrictor 100. In another embodiment, the flow noise restrictor 100 is cut/drilled to form the features 110.

In one embodiment, the flow noise restrictor 100 does not contact the barrel 31 or valve seat 26.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A flush valve comprising:
   valve body having an inlet and an outlet
   a valve assembly comprising a valve member and barrel in communication with the inlet and the outlet and having an exterior surface and an interior surface with a valve seat defined at the upper portion of the barrel, the valve member seatable upon the valve seat to seal the inlet from the outlet;
   the valve assembly having a flow noise restrictor adjacent to the valve seat; and
   the flow noise restrictor having a sidewall with a plurality of features formed in the sidewall and partially defining a fluid flow surface non-parallel with the valve member, the flow noise restrictor disposable about the exterior portion of the barrel and the fluid flow path extending from exterior of the flow noise restrictor, through the plurality of features to interior of the flow noise restrictor and into the barrel;
   wherein the flow noise restrictor has a continuously variable circumferential cross-section.

2. The flush valve of claim 1, wherein the flow noise restrictor is positioned such that vortices in fluid flowing through the flush valve are positioned upstream of the valve seat.

3. The flush valve of claim 1, wherein the sidewall is curved.

4. The flush valve of claim 1, wherein the flush valve assembly comprises a diaphragm assembly and the valve member comprising a diaphragm wherein the flow noise restrictor extends from the diaphragm.

5. The flush valve of claim 1, wherein the plurality of features are selected from the group consisting of sinusoidal, triangular, and semi-circular.

6. The flush valve of claim 1, wherein the flow noise restrictor comprises angled edges.

7. A valve assembly comprising:
   a valve member and a valve seat, the valve member seatable upon the valve seat to seal the inlet from the outlet; and
   the valve assembly having a flow noise restrictor adjacent to the valve seat and partially defining a fluid flow path; and
   the flow noise restrictor having a sidewall and a fluid flow surface defining a plurality of features;
   wherein the flow noise restrictor has a continuously variable circumferential cross-section; and
   further wherein the flow noise restrictor features extend from the valve member towards the valve seat and the fluid flow path passes between each of the features perpendicular to the features, the flow noise restrictor at least partially annularly disposed about an exterior circumference of the valve seat when the valve assembly is closed.

8. The valve assembly of claim 7, wherein the flow noise restrictor is positioned such that vortices in fluid flowing through the valve assembly are positioned upstream of the valve seat.

9. The valve assembly of claim 7, wherein the sidewall is curved.

10. The valve assembly of claim 7, wherein the plurality of features are selected from the group consisting of sinusoidal, triangular, or semi-circular.

11. The valve assembly of claim 7, wherein the plurality of features each have a width increasing towards the fluid flow surface.

12. The valve assembly of claim 7, wherein the flow noise restrictor comprises angled edges.

13. The valve assembly of claim 7, herein the flow noise restrictor features are non-symmetrically disposed about the flow noise restriction with respect to each other.

* * * * *